Aug. 18, 1936.  W. J. LINDECKER  2,051,800
INSECT TRAP
Filed Feb. 24, 1936
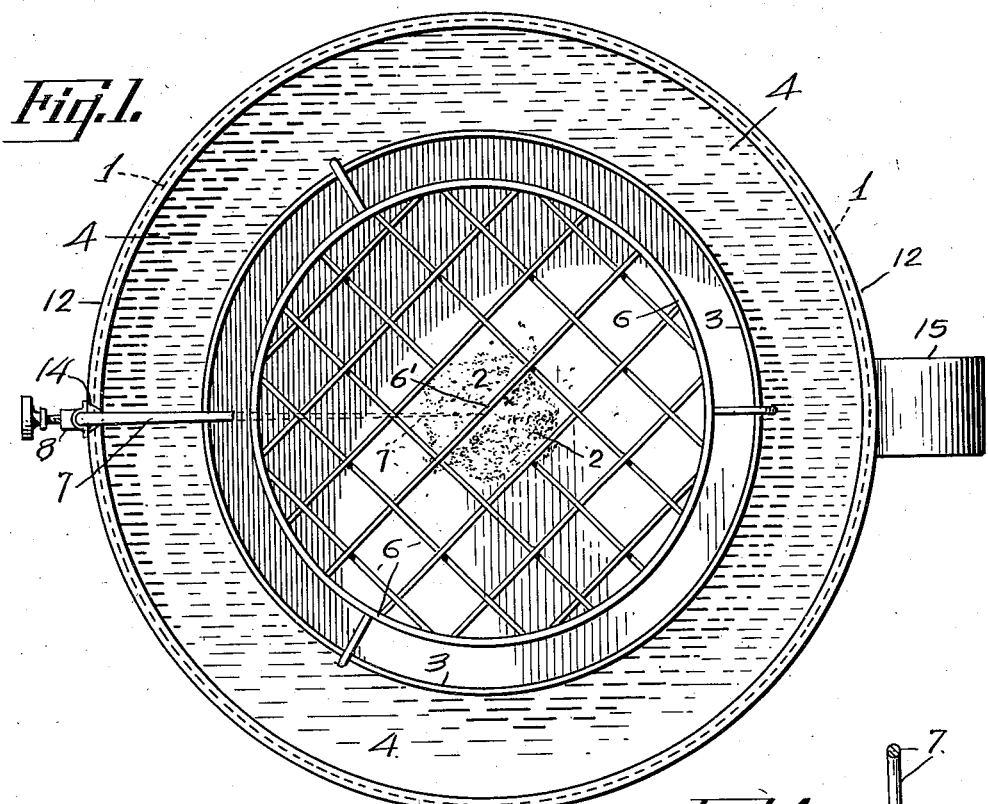
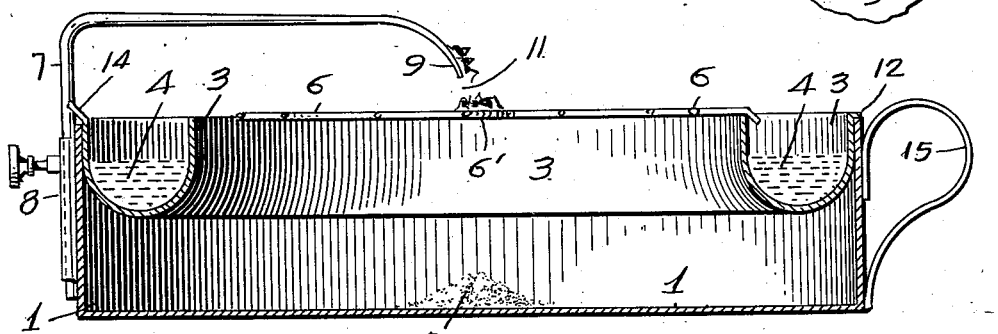
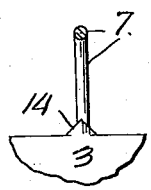
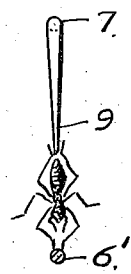
INVENTOR.
WILLIAM J. LINDECKER.
By Arthur L. Slee
HIS ATTORNEY.

Patented Aug. 18, 1936

2,051,800

UNITED STATES PATENT OFFICE 2,051,800

INSECT TRAP

William J. Lindecker, San Francisco, Calif.

Application February 24, 1936, Serial No. 65,329

5 Claims. (Cl. 43—121)

My invention relates to improvements in insect traps and particularly ant traps, wherein a container, forming a bait compartment, is provided with an annular moat containing an insecticide to bar egress from said compartment and operates in conjunction with a labyrinthic insect-walk or passage having a traversible gap instinctively negotiated by an insect or ant seeking entrance and as instinctively avoided or ignored by said insect when seeking egress from the trap.

The primary object of the present invention is to provide a new and improved insect trap.

Another object is to provide an insect trap which may be used to trap and destroy insects without the use of dangerous poisons.

A further object is to provide a new and improved insect trap having a labyrinthic passage or walk into and out of said trap to confuse and perplex an insect seeking egress therefrom.

A still further object is to provide a new and improved trap of the character set forth having a labyrinthic passage into and out of said trap, said passage being provided with a vertically disposed gap easily traversed by an insect seeking entrance and instinctively ignored when seeking egress therefrom.

A further object is to provide a trap of the character described which may be cheaply and easily produced and operated with a minimum of expense and no danger to children or domestic pets.

I accomplish these and other objects by means of the preferred form of the invention disclosed in the drawing forming a part of the present application, and in which—

Fig. 1 is a plan view of my improved trap;

Fig. 2 is a vertical transverse sectional view;

Fig. 3 is an enlarged broken detail view disclosing the manner in which an insect instinctively negotiates the gap interposed in the entrance to the trap; and Fig. 4 is another enlarged, broken detailed view more fully set forth in the specifications.

Referring to the drawing:

The numeral 1 is used to designate a vertically disposed cylindrical container open at the top thereof and forming an inner bait compartment or chamber within the approximate center of which is placed a suitable bait 2, such as sugar or other saccharine edible. Egress from the container 1 is barred by means of a preferably annular moat 3 pressed tightly into the top of the container 1 and containing a substantially harmless insecticide 4, such, for instance, as a solution of soap and water, although many other forms of harmless insecticides may be used.

A wire lattice or grid 6 is mounted within the enclosure of the moat 3 and preferably detachably mounted upon the inner edge of said moat. Preferably the center section of one central wire of the lattice 6 is removed, leaving but a single wire 6' in the center of said lattice, the purpose of which will hereinafter be more fully set forth.

What I term, for convenience, an insect walk is formed of a preferably tapered rod 7 and has its larger end detachably mounted upon the exterior of the container 1, said rod or walk 7 being bent transversely to extend inwardly and above said container 1 and terminating in a free end bent downwardly as at 9 positioned directly over the single central wire 6' of the lattice 6 and in spaced relation to the center of said wire 6', forming a vertically disposed gap 11 between the end of said rod 7 and the center of said wire 6', said gap being slightly less than the length of the insect to be trapped and greater than the height of said insect, as disclosed in Fig. 2 of the drawing.

The moat 3 is provided with an annular flange 12 which rests upon the top of the container 1 to prevent said moat 3 from being moved too far into said container 1 and to form a tighter connection between said moat 3 and said container. At that point in its periphery where it lies adjacent the vertical portion of the rod or walk 7, the flange 12 is indented upwardly against said walk 7 in order to interrupt the continuity of said flange 12 as an insect-walk and to divert the path of an insect traversing said flange onto said rod, and thereby direct said insect into the path which leads into the trap.

A suitable handle 15 may be attached to one side of the container 1 to facilitate handling thereof.

In operation:

After lying upon his belly immediately adjacent the trap over a period of several months, applicant has ascertained these facts: that if the finger is dipped in a solution of sugar and water, or some other sweet lure, then rubbed upon the walk 7 or sides of the container 1, that the ants and certain other insects will quickly gather from considerable distances and climb the sides of the container 1 and the rod or ant-walk 7, searching for the bait 2. They immediately seek the shortest course to the coveted bait by traversing the rim or flange 12 of the moat 3 but as said moat bars entrance as well as exit the prospective victims ultimately climb the rod or walk 7. To hasten their destruction and lead them more quickly into the trap, the indentation 14 is provided which interrupts the continuity of said flange 12 and tends to direct promenaders up the rod 7.

As an ant traverses the walk 7 and arrives at the free downwardly bent end 9 thereof he arrives directly over the bait 2 within the container 1. Instinctively he traverses the vertical gap 11 and lands upon the center of the wire 5' of the lattice or grid 6, as disclosed in Fig. 3 of the drawing and continues over the labyrinthic or tortuous paths presented by the several wires of said lattice, leaving ant-scented trails upon said several paths to the later confusion of himself and his fellows when seeking egress. Ultimately he finds his way over the bottom of the moat 3, inner walls of the container or compartment 1 and achieves his object of finding the bait 2.

After securing his burden of loot the raider, after the manner of ants, seeks egress from the container. Again arrived upon the lattice or grid 6 he becomes confused by the plurality of ant-scented trails in seeking a safe passage to his, or her, nest. Many find surcease in the insecticide of the moat. Others cross and recross the single wire 6' without stopping in the center thereof to seek the outlet directly overhead. Though crowded with ants seeking and gaining entrance via the gap 11 those seeking egress seem to ignore this single avenue of escape. Probably this may be accounted for by the fact that an ant, in traversing the single wire 6', is horizontally disposed with his burden of bait and there is apparently no instinct which compels it to stand erect, when he arrives under the free end of the rod 7, and depart in the instinctive manner by which he arrived. Furthermore, an ant seeking egress is further retarded or diverted from his purpose, when arriving under the gap, by the congested traffic entering the trap via said gap 11, which one-way traffic may have some influence in causing an ant traversing the single wire 6' to follow the more obvious and closer ant-scented trail which but leads him back into the labyrinthic or mystic-maze of the plurality of wires presented by the lattice 6, and eventually into the insecticide of the moat.

After the trap is filled with ants it may be inserted in boiling water or other annihilating agent to destroy the trapped victims, after which it may be properly cleaned and reset with new supplies of bait 2 and insecticide 4.

While more potent insecticides may be used within the moat 3 I have found that the substantially harmless solution of water and soap quickly kills ants entering such solution. The advantage of employing this harmless insecticide, especially where children are about the premises, is obvious. I have also found that unadulterated sugar, instead of various ant poisons, is not only sufficient to attract ants and other insects but is also harmless to children, domestic pets and adults.

From the foregoing it is obvious that I have provided a new and improved insect trap, and one particularly efficacious in trapping and destroying ants without the use of harmful or dangerous poisons for bait, and one which may be cheaply produced and easily operated with a minimum of expense and labor.

Having described my invention I claim—

1. An insect trap comprising a bait compartment; a moat for containing an insecticide barring egress from said compartment; and an insect walk for providing entrance into said trap and arranged in spaced relation thereto to provide a traversible gap between said walk and said trap, said gap being slightly less than the length of insects being trapped and greater than the height of said insects.

2. An insect trap comprising a compartment for containing bait; a moat for containing an insecticide and barring egress from said compartment; a lattice mounted above said compartment and enclosed by said moat and providing a plurality of tortuous paths; and an insect-walk leading from the exterior of said trap to the center of said lattice and having one end arranged in spaced relation above said lattice to provide a gap less than the length of an insect to be trapped and greater than the height of said insect.

3. An insect trap comprising a container for bait and forming a chamber open at the top thereof; a moat for containing an insecticide pressed into the top of said container and barring egress therefrom; a wire lattice mounted upon the inner edge of said moat and providing a plurality of paths to confuse insects seeking egress from said trap; and an insect-walk having one end mounted upon the exterior of said container and the other end arranged in spaced relation above the same and in vertically spaced relation to the center of said lattice to provide a gap readily traversable by an insect entering said trap.

4. An insect trap comprising a vertically disposed cylindrical bait container open at the top thereof; an annular moat for containing an insecticide and pressed into the top of said container and barring egress therefrom; a wire lattice detachably mounted upon the inner edge of said moat and providing a plurality of paths to confuse insects seeking egress from said trap; and an insect-walk leading from the exterior of said trap to the center of said lattice and having an end arranged in vertically spaced relation to said center and providing a gap instinctively negotiable by an insect seeking entrance to said trap and substantially undiscernible to an insect seeking egress therefrom.

5. An insect trap comprising a vertically disposed bait container open at the top thereof; an annular moat, for containing an insecticide, pressed into the top of said container and barring egress therefrom; a wire lattice enclosed by said moat; and an insect-walk comprising a tapered rod having its larger end mounted upon the exterior of the container and arranged above said lattice and having its other end arranged in spaced relation with an intermediate point upon a central wire of said lattice to provide a readily traversable gap between said lattice and said other end.

WILLIAM J. LINDECKER.